United States Patent
Knoener et al.

(10) Patent No.: US 10,967,451 B2
(45) Date of Patent: Apr. 6, 2021

(54) METHODS AND APPARATUS TO CONTROL HOT-START WELD CURRENT FOR ARC IGNITION

(71) Applicant: Illinois Tool Works Inc., Glenview, IL (US)

(72) Inventors: Craig Steven Knoener, Appleton, WI (US); Zach MacMullen, Larsen, WI (US); Charles Ace Tyler, Neenah, WI (US); Lucas Charles Johnson, Appleton, WI (US)

(73) Assignee: ILLINOIS TOOL WORKS INC., Glenview, IL (US)

(*) Notice: Subject to any disclaimer, the term of this patent is extended or adjusted under 35 U.S.C. 154(b) by 797 days.

(21) Appl. No.: 15/419,498

(22) Filed: Jan. 30, 2017

(65) Prior Publication Data
US 2017/0282274 A1 Oct. 5, 2017

Related U.S. Application Data

(60) Provisional application No. 62/316,223, filed on Mar. 31, 2016.

(51) Int. Cl.
| B23K 9/10 | (2006.01) |
| B23K 9/067 | (2006.01) |
| B23K 9/095 | (2006.01) |
| B23K 9/173 | (2006.01) |
| B23K 9/007 | (2006.01) |

(52) U.S. Cl.
CPC ............ *B23K 9/0672* (2013.01); *B23K 9/007* (2013.01); *B23K 9/067* (2013.01); *B23K 9/0953* (2013.01); *B23K 9/0956* (2013.01); *B23K 9/173* (2013.01)

(58) Field of Classification Search
CPC .. B23K 9/0672; B23K 9/0732; B23K 10/006; B23K 9/067; B23K 9/095; B23K 9/0956
USPC ....... 219/130.21, 130.1–130.51, 136, 137 R, 219/137 PW, 137.2, 137.7
See application file for complete search history.

(56) References Cited

U.S. PATENT DOCUMENTS

| 3,904,846 | A |  | 9/1975 | Risberg | |
| 4,547,654 | A | * | 10/1985 | Stol | B23K 9/1093 |
| | | | | | 219/136 |
| 5,136,139 | A | * | 8/1992 | Gilliland | B23K 9/091 |
| | | | | | 219/130.21 |
| 5,168,144 | A | * | 12/1992 | Hongu | B23K 9/067 |
| | | | | | 219/137.71 |
| 6,075,225 | A | | 6/2000 | Heraly | |
| 6,107,602 | A | | 8/2000 | Geissler | |

(Continued)

FOREIGN PATENT DOCUMENTS

| CN | 1616929 A | 5/2005 |
| CN | 102632353 | 8/2012 |

(Continued)

*Primary Examiner* — Sang Y Paik (74) *Attorney, Agent, or Firm* — McAndrews, Held & Malloy, Ltd.

(57) ABSTRACT

Methods and apparatus to control hot-start weld current for arc ignition are disclosed. An example welding-type power supply includes a power converter to output welding-type current, a temperature monitor to determine a temperature of an electrode using at least one of a temperature measurement or a thermal model, and a current controller to control a hot-start weld current output by the power converter based on the temperature of the electrode.

20 Claims, 5 Drawing Sheets

(56) References Cited

U.S. PATENT DOCUMENTS

| | | | |
|---|---|---|---|
| 6,130,407 A * | 10/2000 | Villafuerte | B23K 9/0956 219/130.01 |
| 7,265,318 B2 | 9/2007 | Fosbinder | |
| 9,101,999 B2 | 8/2015 | Lambert | |
| 2006/0213893 A1* | 9/2006 | McGushion | B23K 9/0286 219/137 PS |
| 2012/0152922 A1* | 6/2012 | Hung | B23K 9/323 219/130.1 |
| 2012/0298642 A1* | 11/2012 | Lambert | B23K 9/0673 219/130.21 |
| 2014/0151350 A1* | 6/2014 | Hemmert | B23K 9/0956 219/137.7 |
| 2014/0217077 A1* | 8/2014 | Davidson | B23K 9/173 219/130.33 |
| 2016/0151852 A1* | 6/2016 | Sarkiniemi | B23K 9/0956 219/130.51 |
| 2017/0165779 A1* | 6/2017 | Barhorst | B23K 9/1093 |

FOREIGN PATENT DOCUMENTS

| | | |
|---|---|---|
| JP | S63290685 A | 11/1988 |
| JP | 2002028781 A | 1/2002 |
| WO | 20140191611 A1 | 12/2014 |

* cited by examiner

METHODS AND APPARATUS TO CONTROL HOT-START WELD CURRENT FOR ARC IGNITION

RELATED APPLICATIONS

This patent claims priority to U.S. Provisional Patent Application Ser. No. 62/316,223, filed Mar. 31, 2016, entitled "Methods and Apparatus to Control Hot-Start Weld Current for Arc Ignition." The entirety of U.S. Provisional Patent Application Ser. No. 62/316,223 is incorporated herein by reference.

BACKGROUND

The invention relates generally to welding systems, and more particularly to methods and apparatus to control hot-start weld current for arc ignition.

Igniting weld current in a welding process can be difficult and/or inconsistent, particularly for inexperienced operators. A conventional method to improve arc ignition is to increase the weld current for a short time when the arc is ignited.

SUMMARY

Methods and apparatus to control hot-start weld current for arc ignition, substantially as illustrated by and described in connection with at least one of the figures, as set forth more completely in the claims.

DETAILED DESCRIPTION

As used herein, increased weld current applied after an arc ignites and before the weld current is reduced to a steady state (e.g., current setpoint) weld current value is referred to as hot-start weld current. Hot-start weld current may be adjusted by the welding operator. Conventionally, hot-start weld current is represented to the welding operator as either an absolute current and/or as a percentage of the steady-state current.

In some conventional systems, hot-start weld current is fixed to a set hot-start weld current for the welding system to improve cold electrode starts. However, a high level of hot-start current may cause welding operators who perform repetitive welds (e.g., a series of tack welds) to cause blow through at the workpiece, because subsequent welds do not necessarily start with a cold electrode. Some conventional welding power sources allow the welding operator to adjust hot-start weld current, which is independent of electrode temperature.

Disclosed example welding systems and/or power supplies automatically adjust hot-start weld current based on an actual or estimated electrode temperature. Disclosed examples improve welding operations such as repetitive tack welding by automatically decreasing the hot-start weld current for a hotter electrode. Due to the reduced hot-start weld current when the electrode is hot, arc ignitions are more consistent and can result in a cumulative reduction in the time to perform multiple weld operations. Some disclosed examples are useful for welding process types including shielded metal arc welding (SMAW), gas tungsten arc welding (GTAW), aluminum welding, and/or any other welding-type processes in which temperature-dependent hot-start welding current may improve arc ignition.

Disclosed examples enable more consistent are ignition by automatically increasing and/or decreasing the hot-start weld current to improve the ease of arc ignition. For a given electrode temperature, if the hot-start weld current is too low, the electrode may stick to the workpiece. Conversely, for a given electrode temperature, if the hot-start weld current is too high, the arc can quickly result in blow through of the workpiece, resulting in rework and/or scrapping of the workpiece.

As used herein, the term "proportional relationship" includes directly proportional (e.g., an increase in variable A results in an increase in variable B) and/or inversely proportional relationships (e.g., an increase in variable A results in a decrease in variable B).

Some disclosed examples use an adjusted (e.g., reduced) hot-start current for a fixed or dynamic time after each weld, after which the hot-start current returns to a nominal value (e.g., a set value, a value corresponding to a cold electrode). For example, for the first 3 seconds (or other time period) after each weld, disclosed examples set the hot-start current to the weld current (e.g., reduced from the nominal hot-start weld current value). After the 3 seconds (or other time period), disclosed examples adjust the hot-start current to the nominal hot-start current value. Some disclosed examples use multiple time periods and hot-start current values, such as using a first reduced hot-start current for a first time period following a weld, a second, higher hot-start weld current for the next time period following the first time period, and then return to the nominal hot-start current.

Disclosed example welding-type power supplies include a power converter to output welding-type current, a temperature monitor to determine a temperature of an electrode using at least one of a temperature measurement or a thermal model, and a current controller to control the power converter to output a hot-start weld current based on the temperature of the electrode.

Disclosed example welding-type systems include a welding-type power source to provide welding-type power to a welding torch. The welding-type power includes hot-start weld current and steady state weld current. The example welding-type systems further include a temperature monitor to determine a temperature of an electrode using at least one of a temperature measurement or a thermal model, and a current controller to control the welding-type power source to output a hot-start weld current based on the temperature of the electrode.

In some examples, the current controller selects the hot-start weld current based on a proportional relationship between the temperature of the electrode and the hot-start weld current. In some examples, the proportional relationship includes discrete hot-start weld current values corresponding to elapsed time periods following an end of a weld. In some examples, the proportional relationship includes a continuous increase in the hot-start weld current as an elapsed time following an end of a weld increases during a time period following the end of the weld.

In some examples, the current controller determines a lower limit of the hot-start weld current corresponding to an upper temperature threshold of the electrode, and increases the hot-start weld current from the lower limit as time progresses following a first weld until an arc is initiated for a second weld or an upper limit of the hot-start weld current is reached. In some examples, the current controller determines an upper limit of the hot-start weld current corresponding to at least one of a lower temperature threshold or a threshold elapsed time following a previous weld.

In some examples, the temperature monitor determines the temperature of the electrode by determining an elapsed time since an end of a prior welding operation, and applies the elapsed time to the thermal model to determine the temperature of the electrode. In some such examples, the thermal model is based on at least one of a dimension of the electrode, a material of the electrode, or the welding-type current conducted through the electrode in the prior welding operation.

Disclosed example machine readable instructions cause a control circuit to identify an end of a welding arc at a welding torch, determine a temperature of an electrode at the welding torch, select a hot-start weld current based on the temperature of the electrode, and control a welding-type power source to output the hot-start weld current in response to an arc ignition at the welding torch.

In some examples, the instructions cause the control circuit to select the hot-start weld current based on a proportional relationship between the temperature of the electrode and the hot-start weld current. In some examples, the instructions cause the control circuit to select the hot-start weld current based on the temperature of the electrode comprises determining an elapsed time following the end of the welding arc, where the temperature is based on the elapsed time according to a thermal model. In some such examples, the thermal model is based on at least one of a dimension of the electrode, a material of the electrode, or welding-type current conducted through the electrode in a prior welding operation terminated by the end of the welding arc.

Figure 1:
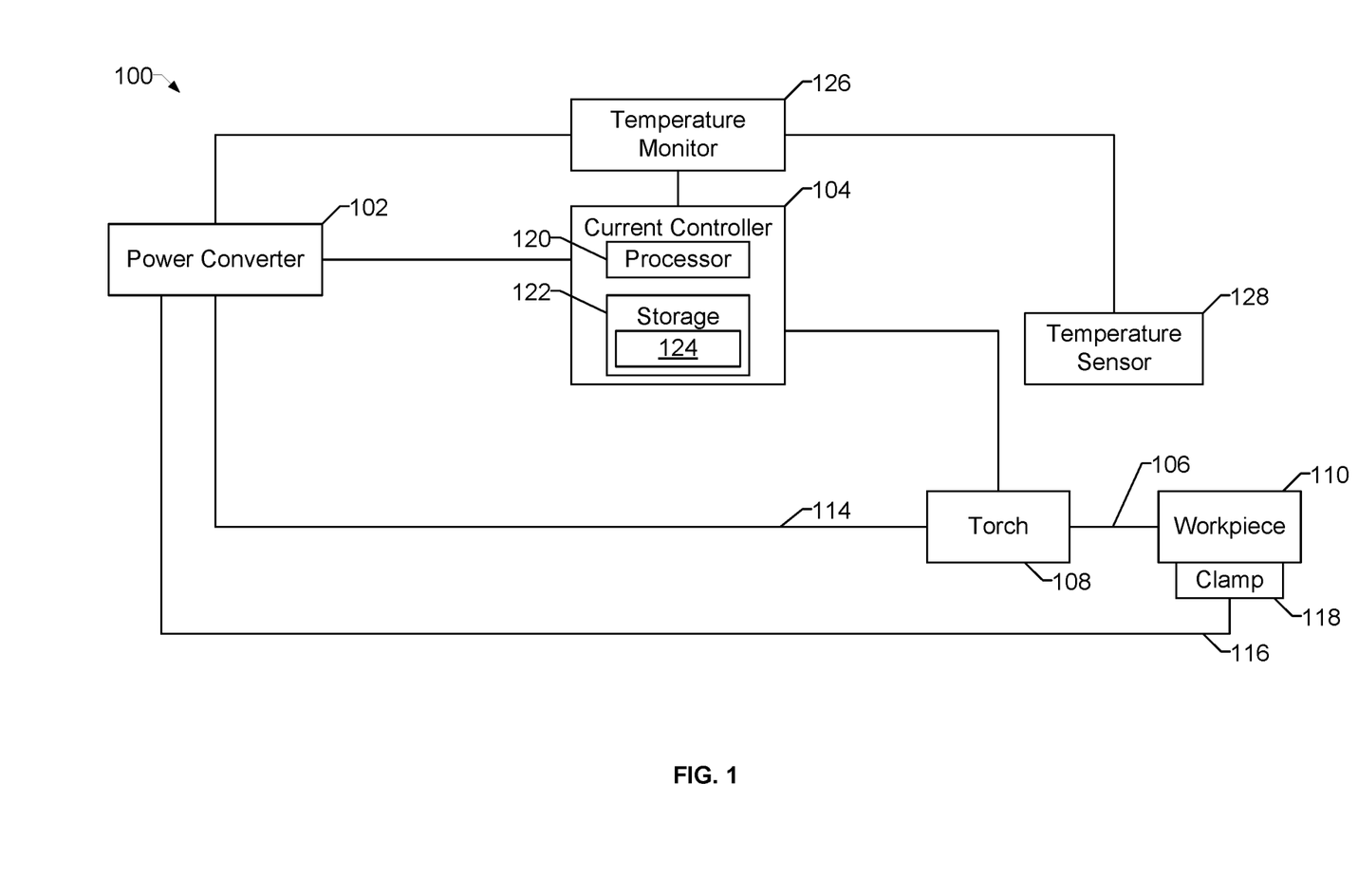
FIG. 1 is a schematic diagram of an example welding-type system including a power converter and a current controller, and configured to control a hot-start weld current based on a temperature of an electrode, in accordance with aspects of this disclosure.

FIG. 1 is a schematic diagram of an example welding-type system 100 including a power converter 102 and a current controller 104. As described in more detail below, the example current controller 104 of FIG. 1 is configured to control a hot-start weld current based on a temperature of an electrode 106.

The example welding-type system 100 of FIG. 1 includes any device capable of supplying welding-type power, including inverters, converters, choppers, resonant power supplies, quasi-resonant power supplies, etc., as well as control circuitry and other ancillary circuitry associated therewith. Welding-type power refers to power suitable for welding, plasma cutting, induction heating, CAC-A and/or hot electrode welding/preheating (including laser welding and laser cladding).

The welding-type system 100 includes a welding torch 108 that provides the welding-type power to the electrode 106. The electrode 106 is a consumable or non-consumable electrode that defines the location of a welding operation with respect to a workpiece 110. In cases in which the welding operation is a manual operation (e.g., performed by a human operator), the torch 108 enables an operator to handle the electrode 106 to control the arc. The power converter 102 provides welding-type power to the torch 108 and the electrode 106 via a weld cable 114, a work cable 116, and/or a work clamp 118.

The current controller 104 (e.g., control circuitry, which may include logic circuits) controls a hot-start weld current output by the power converter 102. The setpoint welding current may be based on, for example, a welding voltage setpoint, a welding current setpoint, a type of joint, an electrode material, a workpiece material, and/or other factors. The current controller 104 includes a processor 120 and one or more machine readable storage device(s) 122. The current controller 104 may be implemented as part of general-purpose control circuitry, such as executing instructions with the processor 120 to implement motor control functionality.

The current controller 104 may determine the hot-start weld current prior to arc ignition and controls the power converter 102 to use the hot-start weld current for arc ignition. After the arc is ignited and, in some examples, for a time period after the arc is ignited, the power converter 102 continues to use the hot-start weld current. After the arc is ignited, the power converter 102 changes to the steady-state weld current, which may be a current setpoint based on a constant voltage (CV) control, a constant current (CC) control, and/or any other welding process control method.

Following a welding operation (e.g., when the arc is extinguished), the electrode 106 at the torch 108 has an elevated temperature due to the welding-type current that flowed through the electrode immediately prior to the cessation of the welding operation. The temperature of the electrode 106 decreases as time elapses after the end of the prior weld. A temperature monitor 126 determines the temperature of the electrode 106 based on a temperature measurement of the electrode (or a representative component) and/or a thermal model. In some examples, the temperature monitor 126 monitors the elapsed time and may approximate the electrode temperature by applying the elapsed time (e.g., use the elapsed time as a proxy for temperature of the electrode 106) to a thermal model that models a temperature change in the electrode 106 over time, which may include using one or more characteristics of the electrode 106 (e.g., electrode material, electrode diameter, current used in the prior weld, etc.). After a threshold time period has elapsed, the temperature monitor 126 may assume that the arc ignition will operate in a same manner as a cold (e.g., unused) electrode and return to a default or nominal hot-start weld current.

To determine the hot-start weld current, the example current controller 104 uses proportional relationship(s) 124 stored in the example storage device(s) 122. The example proportional relationship(s) 124 specify one or more relationship(s) between hot-start weld current and the temperature of the electrode 106. Examples of the proportional relationship(s) 124 may include data points, algorithms, and/or equations. The proportional relationship 124 may be directly proportional or inversely proportional, for example, depending on how the variables in the proportional relationship 124 are defined. Example proportional relationship(s) 124 include contiguous relationships (e.g., defined by linear, logarithmic, exponential, inverse exponential, and/or any other type of equation), and/or discontiguous relationships, and/or discrete hot-start weld currents (e.g., stepped relationships). For example, it has been observed that arc ignition occurs more readily with higher hot-start weld current when the electrode 106 has a lower temperature than when the electrode 106 has a higher temperature. The example current controller 104 leverages this observation by applying a measured and/or estimated temperature of the electrode 106 to the proportional relationship 124 (e.g., a proportional relationship between hot-start weld current and measured temperature of the electrode 106).

Additionally or alternatively, the example current controller 104 may receive a temperature measurement signal from a temperature sensor 128. The example temperature sensor 128 is an infrared non-contact thermal sensor mounted to the torch 108 to conduct non-contact temperature measurement of the electrode 106. In this manner, the temperature sensor 128 may be configured to focus a point of non-contact measurement on the tip of the electrode 106 regardless of the orientation and/or movement of the torch 108.

The temperature sensor 128 may be configured to measure any location, which may include measuring a consumable component and/or a non-consumable component in the weld torch. For example, the temperature sensor 128 may be a sensor in thermal communication with the contact tip or other consumable or non-consumable component. In some examples, the temperature sensor 128 includes a radio frequency identification (RFID) tag or other wireless communications device to communicate a temperature measurement in response to a request (e.g., an RFID signal) transmitted by the temperature monitor 126. In some examples, the temperature monitor 126 uses a thermal model to determine the electrode temperature based on the location from which the temperature measurement is obtained (e.g., a model indicating the electrode temperature based on a measured contact tip temperature).

Figure 2A:
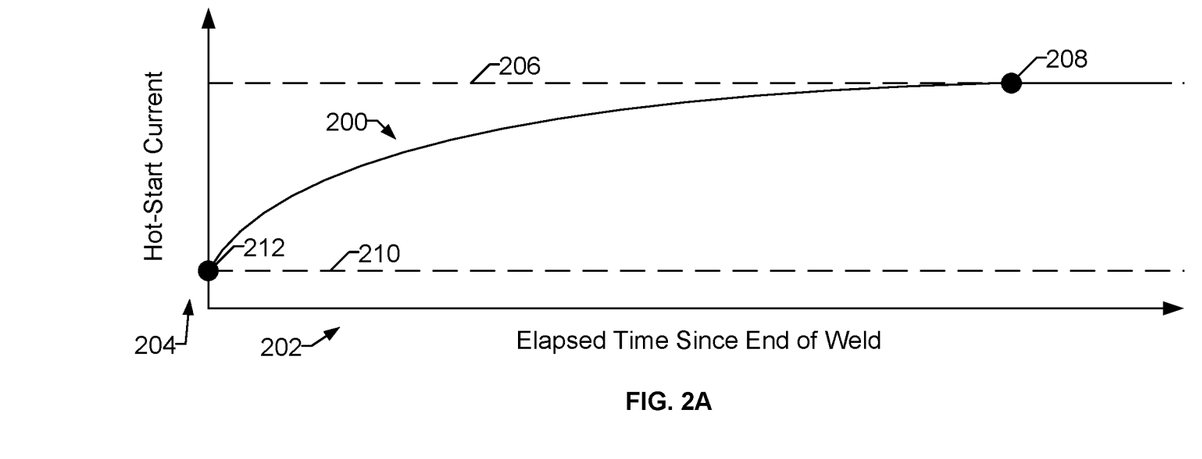
FIG. 2A is a graph illustrating an example proportional relationship between an electrode temperature and a hot-start weld current used by the example system of FIG. 1, in accordance with aspects of this disclosure.

FIG. 2A is a graph illustrating an example proportional relationship 200 between an electrode temperature (e.g., via an elapsed time 202 since a previous weld) and a hot-start weld current 204 used by the example system 100 of FIG. 1. The relationship 200 of FIG. 2A is an example of a contiguous relationship between the elapsed time 202 since the previous weld (e.g., determined via the temperature monitor 126 of FIG. 1) and the hot-start weld current 204. The relationship 200 is not a linear relationship (e.g., a y=ax+b relationship), and represents an estimated decline in the temperature of the electrode 106 over time. The relationship 200 may be defined using linear, quadratic, exponential, logarithmic, inverse proportional and/or any other type or classification of relation.

In some examples, the current controller 104 determines an upper limit 206 of the hot-start weld current 204 (e.g., a maximum hot-start weld current) that corresponds to a lower temperature threshold 208 (e.g., a minimum temperature and/or maximum elapsed time that corresponds to a nominal or default hot-start weld current, which may be functionally similar or identical to a cold electrode) of the electrode 106. Additionally or alternatively, the current controller 104 determines a lower limit 210 of the hot-start weld current 204 (e.g., the minimum hot-start weld current). The lower limit 210 may correspond to an upper temperature threshold and/or a lower or minimum elapsed time 212 following a previous weld. The current controller 104 increases the hot-start weld current 204 from the lower limit 210 of the hot-start weld current 204 (as the elapsed time 202 progresses following a first weld) until an arc is initiated for a second weld, and/or until the upper limit 206 of the hot-start weld current 204 is reached.

Figure 2B:
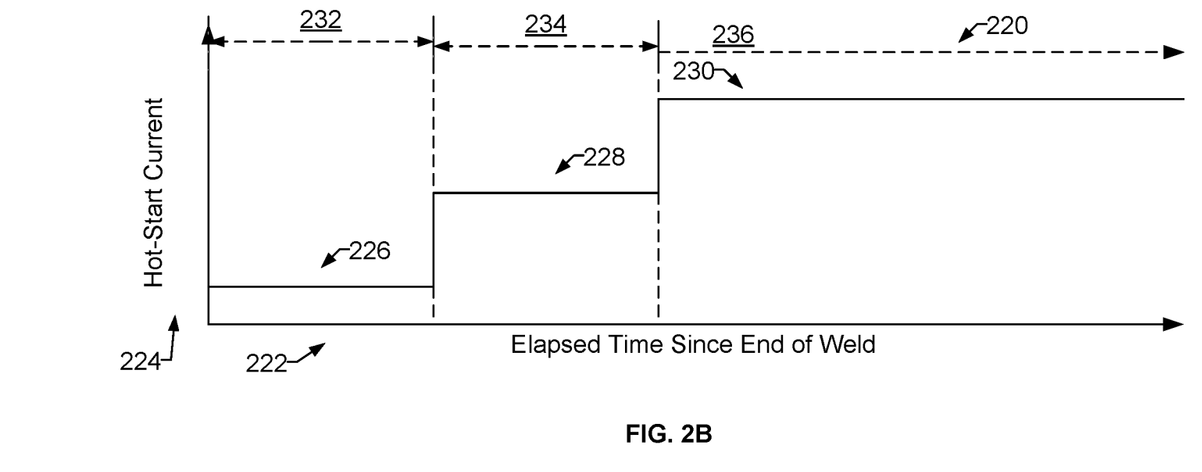
FIG. 2B is a graph illustrating another example proportional relationship between an electrode temperature and a hot-start weld current used by the example system of FIG. 1, in accordance with aspects of this disclosure.

FIG. 2B is a graph illustrating another example proportional relationship 220 between an electrode temperature (e.g., via an elapsed time 222 since a previous weld, measured by the temperature monitor 126) and a hot-start weld current 224 used by the example systems of FIG. 1. The example relationship 220 represents a set of discrete relationships 226, 228, 230 that correspond to different elapsed time ranges 232, 234, 236. In the example of FIG. 2B, the current controller 104 uses a hot-start weld current 224 defined by the relationships 226, 228, 230 when the elapsed time is within the corresponding time range 232, 234, 236. The example time range 236 extends indefinitely after the time range 234 (e.g., the current controller 104 assumes a cold electrode after a threshold time has elapsed).

As illustrated in FIG. 2B, the hot-start weld current 224 increases in steps from one elapsed time period to another. While the relationships 226, 228, 230 are shown as having constant hot-start weld currents 224, any of the example relationships 226, 228, 230 may have increasing hot-start weld currents 224 as the elapsed time increases within the time ranges 232, 234, 236, with discontinuities in the relationship 220 between the time ranges 232, 234, 236. The example current controller 104 may identify an upper hot-start weld current limit and/or a lower hot-start weld current limit for the relationship 220 of FIG. 2B.

Figure 2C:
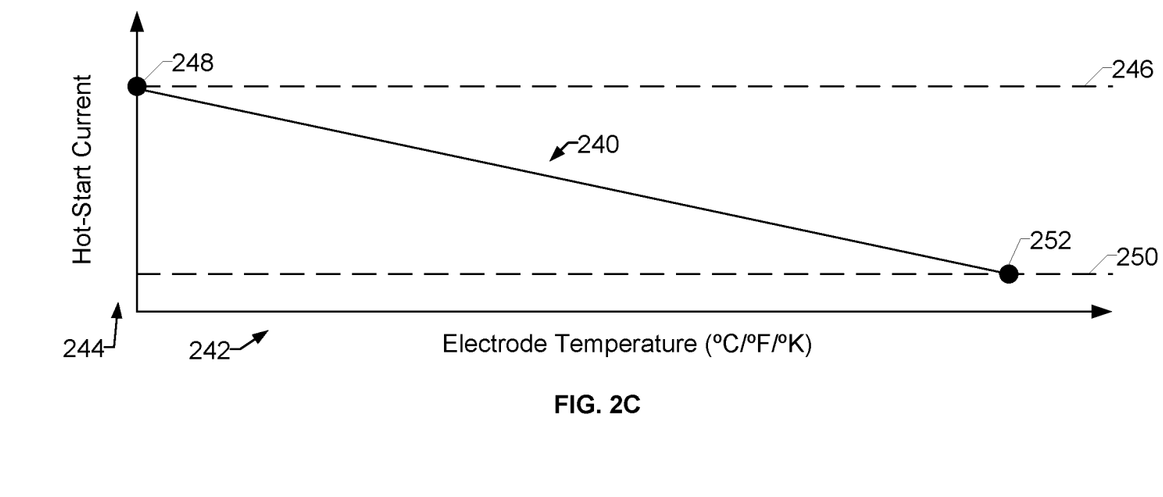
FIG. 2C is a graph illustrating another example proportional relationship between an electrode temperature and a hot-start weld current used by the example system of FIG. 1, in accordance with aspects of this disclosure.

FIG. 2C is a graph illustrating an example proportional relationship 240 between an electrode temperature 242 (e.g., measured by the temperature sensor 128 of FIG. 1) and a hot-start weld current 244 used by the example system 100 of FIG. 1. The relationship 240 of FIG. 2C is an example of a contiguous relationship between the measured temperature 242 and the hot-start weld current 244. As illustrated in FIG. 2C, the relationship 240 is a linear relationship defined between 1) an upper limit 246 on the hot-start weld current 244 (e.g., a nominal hot-start weld current) that corresponds to a lower electrode temperature limit 248 and 2) a lower limit 250 on the hot-start weld current (e.g., a minimum hot-start weld current) that corresponds to an upper electrode temperature limit 252. The upper electrode temperature limit 248 does not necessarily correspond to the maximum possible temperature that may be achieved by the electrode 106. Similarly, the lower electrode temperature limit 252 does not necessarily correspond to a completely cold (i.e., unused) electrode.

Figure 3:
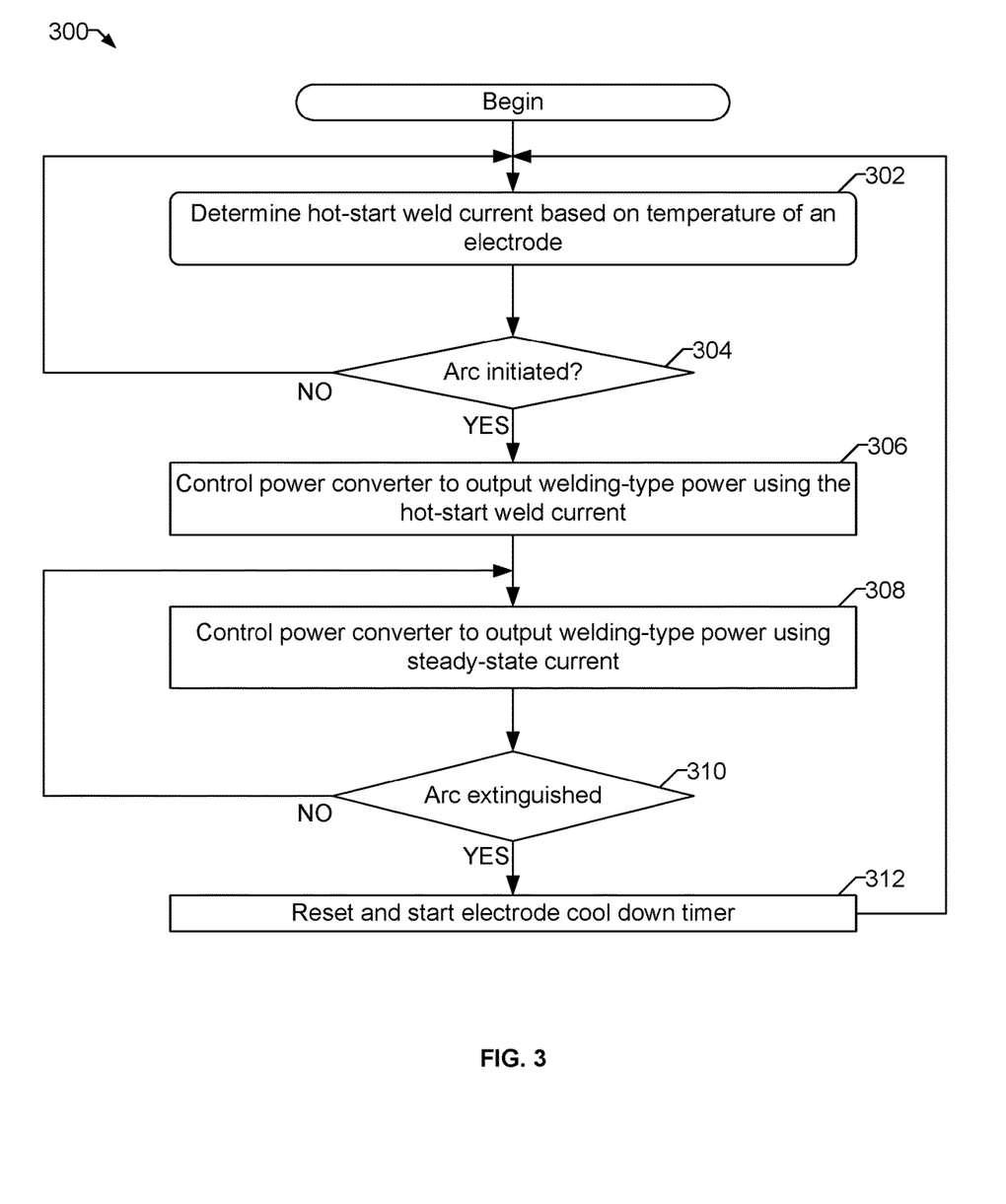
FIG. 3 is a flowchart representative of example method which may be implemented by the example system of FIG. 1 to control hot-start weld current during multiple welding operations.
Figure 4:
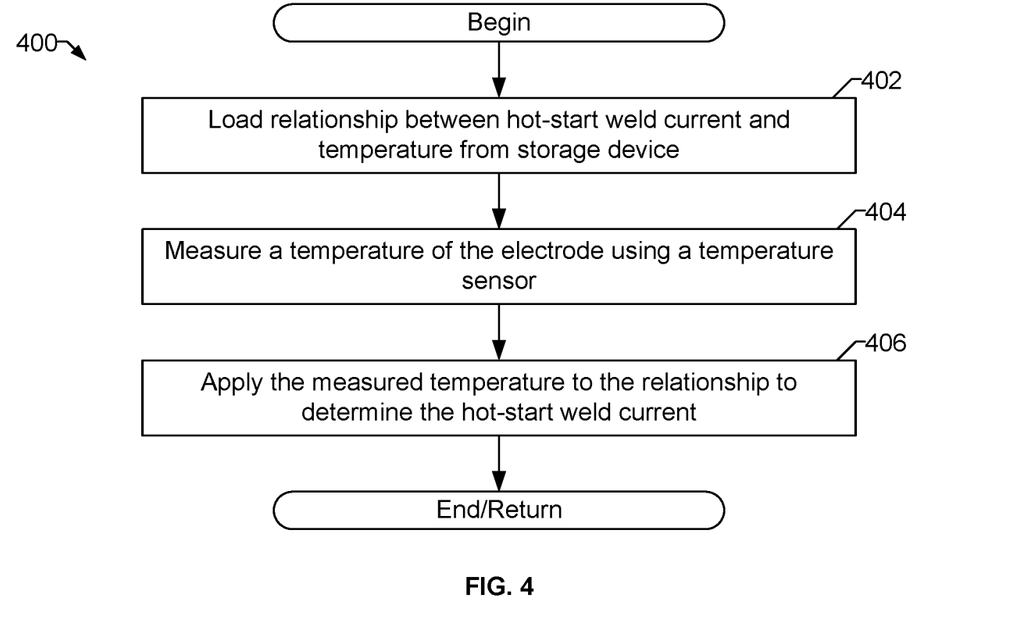
FIG. 4 is a flowchart representative of example method which may be implemented by the example system of FIG. 1 to determine hot-start weld current based on an electrode temperature.
Figure 5:
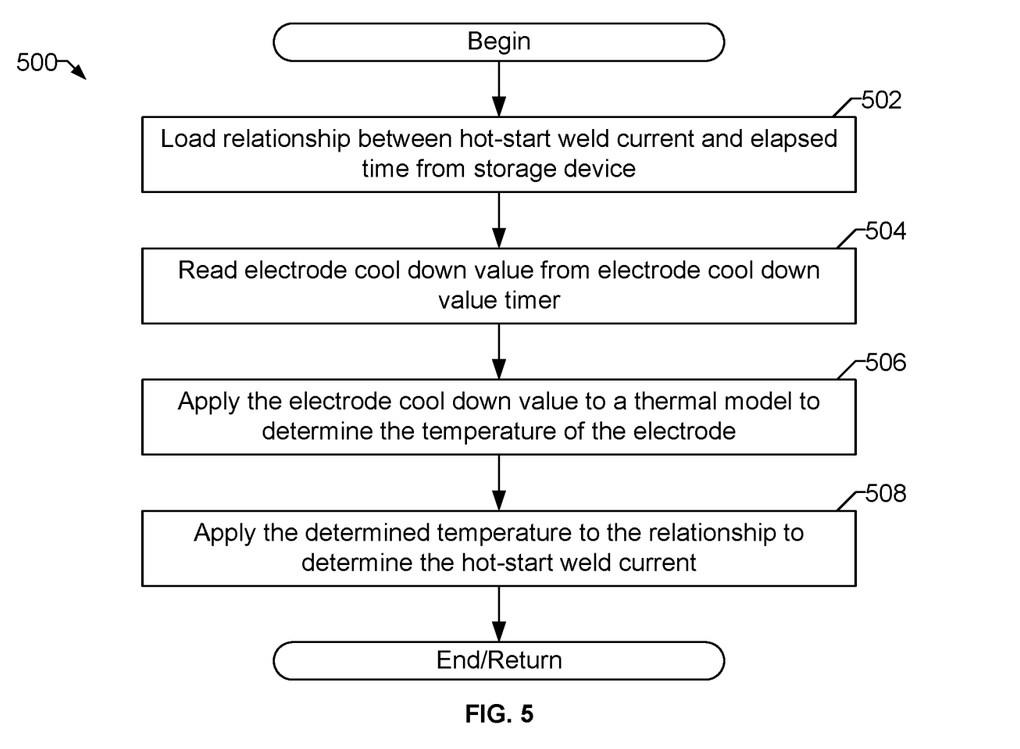
FIG. 5 is a flowchart representative of another example method which may be implemented by the example system of FIG. 1 to determine hot-start weld current based on an electrode temperature.

FIGS. 3, 4, and 5 illustrate example methods that may be used to implement the systems and/or apparatus disclosed herein. In some examples, the disclosed methods can be implemented by a processor or other logic circuit executing machine readable instructions stored on a non-transitory machine readable storage medium, such as a volatile memory device, a non-volatile memory device, a mass storage device (e.g., a hard disk, a solid state storage drive, etc.), removable media (e.g., a flash drive, etc.), and/or any other form of machine readable storage.

FIG. 3 is a flowchart representative of example method 300 which may be implemented by the example systems 100 of FIG. 1 to electrode hot-start weld currents during multiple welding operations. The example method 300 may be implemented by the current controller 104 of FIG. 1.

In block 302 the current controller 104 determines a hot-start weld current based on a temperature of the electrode 106. For example, the current controller 104 may receive the temperature of the electrode 106 from the temperature monitor 126, which determines the temperature from a temperature measurement and/or using an elapsed time since a prior weld (e.g., in conjunction with a thermal model) to determine the hot-start weld current. Example methods that may be performed to implement block 302 are described below with reference to FIGS. 4 and 5.

In block 304, the current controller 104 determines whether an arc has been initiated. For example, the current controller 104 may monitor the current and/or voltage output by the power converter 102 and/or receive a signal from the power converter 102 indicating that an arc is being initiated (e.g., based on the power converter 102 identifying an increase in current). If the arc is not initiated (block 304), control returns to block 302 to repeat determining the hot-start weld current.

When the arc is initiated at the electrode 106 (block 304), at block 306 the current controller 104 controls the power converter 102 to output welding-type power using the determined hot-start weld current. At block 308, the current controller 104 controls the power converter 102 to output the welding-type power using a steady-state current. For example, the power converter 102 may reduce the current from the hot-start current to a CC current setpoint and/or CV-controlled current.

In block 310, the current controller 104 determines whether the arc is extinguished. For example, the current controller 104 may receive voltage information and/or current information from the power converter 102 indicating that the arc has extinguished. If the arc has not extinguished (block 310), control returns to block 308 to continue controlling the power converter 102 to output the steady-state current.

When the arc is extinguished (block 310), the temperature monitor 126 resets and starts an electrode cool down timer. The example temperature monitor 126 uses the electrode cool down timer to approximate a temperature of the electrode 106 for determining the hot-start weld current. The example current controller 104 returns control to block 302.

FIG. 4 is a flowchart representative of example method 400 which may be implemented by the example systems 100 of FIG. 1 to determine hot-start weld current based on an electrode temperature. The example method 400 of FIG. 4 may be performed to implement block 302 of FIG. 3 to determine a hot-start weld current based on the electrode temperature. The method 400 may be performed while an arc is not present at the electrode 106 (e.g., between welding operations).

In block 402, the current controller 104 loads a relationship (e.g., the relationship 124 of FIG. 1) between the hot-start weld current and the temperature from a storage device (e.g., the storage device 122). For example, the current controller 104 may load one of the relationships 200, 220, 240 of FIGS. 2A, 2B, 2C.

In block 404, the temperature sensor 128 measures a temperature of the electrode 106.

In block 406, the current controller 104 applies the measured temperature to the loaded relationship to determine the hot-start weld current. For example, the current controller 104 may apply the measured temperature to the relationship 240 to determine a corresponding hot-start weld current. When the hot-start weld current is determined (block 406), the example method 400 ends and control returns to a calling function, such as block 304 of FIG. 3.

FIG. 5 is a flowchart representative of another example method 500 which may be implemented by the example system 100 FIG. 1 to determine hot-start weld current based on an electrode temperature. The example method 500 of FIG. 5 may be performed to implement block 302 of FIG. 3 to determine a hot-start weld current based on the electrode temperature. The method 500 may be performed after determining that a torch trigger 112 is depressed.

In block 502, the current controller 104 loads a relationship (e.g., the relationship 124 of FIG. 1) between the hot-start weld current and an elapsed time from a storage device (e.g., the storage device 122). For example, the current controller 104 may load one of the relationships 200, 220, 240 of FIGS. 2A, 2B, 2C.

In block 504, the temperature monitor 126 reads an electrode cool down value from an electrode cool down value timer.

In block 506, the temperature monitor 126 applies the electrode cool down value (e.g., elapsed time since the extinguishing of the arc) to a thermal model to determine the temperature of the electrode 106.

In block 508, the current controller 104 applies the determined temperature to the loaded relationship 124 to determine the hot-start weld current. For example, the current controller 104 may apply the measured temperature to the relationship 240 to determine a corresponding hot-start weld current. When the hot-start weld current is determined (block 508), the example method 500 ends and control returns to a calling function, such as block 304 of FIG. 3.

The present methods and systems may be realized in hardware, software, and/or a combination of hardware and software. The present methods and/or systems may be realized in a centralized fashion in at least one computing system, or in a distributed fashion where different elements are spread across several interconnected computing systems. Any kind of computing system or other apparatus adapted for carrying out the methods described herein is suited. A typical combination of hardware and software may include a general-purpose computing system with a program or other code that, when being loaded and executed, controls the computing system such that it carries out the methods described herein. Another typical implementation may comprise an application specific integrated circuit or chip. Some implementations may comprise a non-transitory machine-readable (e.g., computer readable) medium (e.g., FLASH drive, optical disk, magnetic storage disk, or the like) having stored thereon one or more lines of code executable by a machine, thereby causing the machine to perform processes as described herein. As used herein, the term "non-transitory machine-readable medium" is defined to include all types of machine readable storage media and to exclude propagating signals.

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. For example, block and/or components of disclosed examples may be combined, divided, re-arranged, and/or otherwise modified. Therefore, it is intended that the present method and/or system not be limited to the particular implementations disclosed, but that the present method and/or system will include all implementations falling within the scope of the appended claims.

As utilized herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, "and/or" means any one or more of the items in the list joined by "and/or". As an example, "x and/or y" means any element of the three-element set {(x), (y), (x, y)}. In other words, "x and/or y" means "one or both of x and y". As another example, "x, y, and/or z" means any element of the seven-element set ((x), (y), (z), (x, y), (x, z), (y, z), (x, y, z)). In other words, "x, y and/or z" means "one or more of x, y and z". As utilized herein, the term "exemplary" means serving as a non-limiting example, instance, or illustration. As utilized herein, the terms "e.g.," and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled or not enabled (e.g., by a user-configurable setting, factory trim, etc.).

The present methods and/or systems may be realized in hardware, software, or a combination of hardware and software. The present methods and/or systems may be realized in a centralized fashion in at least one computing system, or in a distributed fashion where different elements are spread across several interconnected computing systems. Any kind of computing system or other apparatus adapted for carrying out the methods described herein is suited. A typical combination of hardware and software may be a general-purpose computing system with a program or other code that, when being loaded and executed, controls the computing system such that it carries out the methods described herein. Another typical implementation may comprise an application specific integrated circuit or chip. Some implementations may comprise a non-transitory machine-readable (e.g., computer readable) medium (e.g., FLASH drive, optical disk, magnetic storage disk, or the like) having stored thereon one or more lines of code executable by a machine, thereby causing the machine to perform processes as described herein.

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. Therefore, the present method and/or system are not limited to the particular implementations disclosed. Instead, the present method and/or system will include all implementations falling within the scope of the appended claims, both literally and under the doctrine of equivalents.

What is claimed is:

1. A welding-type power supply, comprising:
a power converter to output welding-type current;
a temperature monitor to determine a temperature of an electrode based on a thermal model that models temperature change in the electrode over time; and
a current controller to control the power converter based on the temperature of the electrode, wherein the controlling comprises:
setting the output welding-type current to hot-start weld current before arc ignition, wherein the setting comprises:
determining an initial value for the hot-start weld current based on the temperature of the electrode; and
adjusting the value of the hot-start weld current until arc ignition based on elapsed time following a previous weld; and
switching the output welding-type current to a steady-state current after an arc ignites.

2. The welding-type power supply as defined in claim 1, wherein the current controller is configured to select the hot-start weld current based on a proportional relationship between the temperature of the electrode and the hot-start weld current.

3. The welding-type power supply as defined in claim 2, wherein the proportional relationship comprises discrete hot-start weld current values corresponding to elapsed time periods following an end of a weld.

4. The welding-type power supply as defined in claim 2, wherein the proportional relationship comprises a continuous increase in the hot-start weld current as an elapsed time following an end of a weld increases during a time period following the end of the weld.

5. The welding-type power supply as defined in claim 1, wherein the current controller is configured to:
determine a lower limit of the hot-start weld current corresponding to an upper temperature threshold of the electrode; and
increase the hot-start weld current from the lower limit as time progresses following a first weld until an arc is initiated for a second weld or an upper limit of the hot-start weld current is reached.

6. The welding-type power supply as defined in claim 1, wherein the current controller is configured to determine an upper limit of the hot-start weld current corresponding to at least one of a lower temperature threshold or a threshold elapsed time following a previous weld.

7. The welding-type power supply as defined in claim 1, wherein the temperature monitor is configured to determine the temperature of the electrode by:
determining an elapsed time since an end of a prior welding operation; and
applying the elapsed time to the thermal model to determine the temperature of the electrode.

8. The welding-type power supply as defined in claim 7, wherein the thermal model is based on at least one of a dimension of the electrode, a material of the electrode, or the welding-type current conducted through the electrode in the prior welding operation.

9. A welding-type system, comprising:
a welding-type power source to provide welding-type power to a welding torch, the welding-type power including hot-start weld current and steady state weld current;
a temperature monitor to determine a temperature of an electrode based on a thermal model that models temperature change in the electrode over time; and a current controller to control the welding-type power source based on the temperature of the electrode, wherein the controlling comprises:
  setting the output welding-type current to hot-start weld current before arc ignition, wherein the setting comprises:
    determining an initial value for the hot-start weld current based on the temperature of the electrode; and
    adjusting the value of the hot-start weld current until arc ignition based on elapsed time following a previous weld; and
  switching the output welding-type current to a steady-state current after an arc ignites.

10. The welding-type system as defined in claim 9, wherein the current controller is configured to select the hot-start weld current based on a proportional relationship between the temperature of the electrode and the hot-start weld current.

11. The welding-type system as defined in claim 10, wherein the proportional relationship comprises discrete hot-start weld currents corresponding to elapsed time periods following an end of a weld.

12. The welding-type system as defined in claim 10, wherein the proportional relationship comprises a continuous increase in the hot-start weld current as an elapsed time following an end of a weld increases during a time period following the end of the weld.

13. The welding-type system as defined in claim 9, wherein the current controller is configured to:
  determine a lower limit of the hot-start weld current corresponding to an upper temperature threshold of the electrode; and
  increase the hot-start weld current from the lower limit as time progresses following a first weld until an arc is initiated for a second weld or an upper limit of the hot-start weld current is reached.

14. The welding-type system as defined in claim 9, wherein the current controller is configured to determine an upper limit of the hot-start weld current corresponding to at least one of a lower temperature threshold or a threshold elapsed time following a previous weld.

15. The welding-type system as defined in claim 9, wherein the temperature monitor is configured to determine the temperature of the electrode by:
  determining an elapsed time since an end of a prior welding operation; and
  applying the elapsed time to the thermal model to determine the temperature of the electrode.

16. The welding-type system as defined in claim 15, wherein the thermal model is based on at least one of a dimension of the electrode, a material of the electrode, or a welding-type current conducted through the electrode in the prior welding operation.

17. A non-transitory machine readable medium comprising machine readable instructions which, when executed, cause a control circuit to:
  identify an end of a welding arc at a welding torch;
  determine a temperature of an electrode at the welding torch based on a thermal model that models temperature change in the electrode over time; and
  control a welding-type power source, wherein the controlling comprises:
    setting the welding-type power source to output hot-start weld current before arc ignition at the welding torch, wherein the setting comprises:
      determining an initial value for the hot-start weld current based on the temperature of the electrode; and
      adjusting the value of the hot-start weld current until arc ignition based on elapsed time following a previous weld; and
    switching the welding-type power source to output a steady-state current in response to an arc ignition at the welding torch.

18. The machine readable medium as defined in claim 17, wherein the instructions are to cause the control circuit to select the hot-start weld current based on a proportional relationship between the temperature of the electrode and the hot-start weld current.

19. The machine readable medium as defined in claim 17, wherein the instructions are to cause the control circuit to select the hot-start weld current based on the temperature of the electrode comprises determining an elapsed time following the end of the welding arc, the temperature being based on the elapsed time according to the thermal model.

20. The machine readable medium as defined in claim 19, wherein the thermal model is based on at least one of a dimension of the electrode, a material of the electrode, or welding-type current conducted through the electrode in a prior welding operation terminated by the end of the welding arc.

* * * * *